UNITED STATES PATENT OFFICE.

EMIL BRUCE PRATT, OF LAKEWOOD, OHIO.

PROCESS OF REDUCING IRON ORES AND OTHER METALLIC OXIDS TO THE METALLIC STATE.

1,167,016.      Specification of Letters Patent.     Patented Jan. 4, 1916.

No Drawing.     Application filed December 24, 1913. Serial No. 808,576.

*To all whom it may concern:*

Be it known that I, EMIL BRUCE PRATT, a citizen of the United States, residing at Lakewood, in the county of Cuyahoga and State of Ohio, have invented new and useful Improvements in Processes of Reducing Iron Ores and other Metallic Oxids to the Metallic State.

This invention relates to the process of reducing iron ores and other metallic oxids by heating within the electric furnace said ores in the presence of a reducing agent, and has for its objects: To render the process considerably cheaper at geographical locations where solid carbon is expensive and where electrical energy is cheap. To provide a process for reducing finely pulverized ores. To regulate the carbon content of the resultant metal. To regulate the silicon content of the resultant metal.

In the reduction of iron oxids to the metallic state, the process has hitherto been effected by the action of heat upon the ores in the presence of a reducing agent, said reducing agent being some form of solid carbon, such as coke, charcoal, or coal, the chemical action being the combination of the unburned carbon with the oxygen of the ore at high temperatures, forming carbon monoxid and carbon dioxid, gases which pass out of the furnace, leaving the metal in the reduced state combined with certain impurities such as carbon, silicon, sulfur, etc., most of which are obtained from the impurities in the solid carbon.

Instead of depending upon the agency of solid carbon for the removal of the oxygen from the ores, I employ a gas or vapor composed chiefly of hydrogen, such as hydrogen, natural gas, methane, ethylene, or such other hydrocarbons as shall give to the reduced metal the desired amount of carbon content.

It may be remarked that pure hydrogen may be obtained by the electrolysis of water and that the other element, oxygen, has a commercial value and is at present being manufactured in this way, the hydrogen being allowed to escape as of no value. It may be further remarked that the gaseous hydrocarbons are decomposed at temperatures below the melting point of iron ore, and that the liquid and solid hydrocarbons, obtained from petroleum, are volatilized and decomposed at temperatures below the melting point of iron ore. Therefore, the chemical action of my process is based upon the strong affinity of hydrogen for oxygen, which transposes the oxygen from the ore to the hydrogen, and the liberated carbon, if any, which is not absorbed by the iron, performs the same function.

The amount of carbon permitted to enter the furnace by this process may be varied from none (in case lime instead of limestone be used for a flux, and pure hydrogen be used as the reducing agent) to any desired amount.

In the reduction of iron ore in the blast furnace, it is stated by some authorities that the silicon content of the reduced iron is derived largely if not entirely from the silica in the solid carbon fuel. This because of the high temperatures necessary to reduce silica to silicon. In my process, no silica exists either in the fuel or in the reducing agent, and therefore whatever silicon enters the reduced iron must come from the impurities in the ore or flux, and if the temperature of the bath be kept even and not far above the melting point of iron, no silicon need be present in the iron.

Any desired amount of silicon content may be obtained by increasing the temperature of the bath, or by adding alloys to the charge.

In the blast furnace, the heat is developed by burning an excess amount of fuel by means of a blast of hot air under pressure. This pressure is so great that finely divided ores are blown out of the furnace. On account of the fact that no blast is necessary in connection with the electric furnace, and on account of the rarefied condition of hydrogen, and carbon and hydrocarbon vapors, at temperatures within the furnace, finely pulverized ores may be used in this process. These rarefied gases and vapors permeate the interstices between the finely divided charge, especially if a slight pressure be maintained within the furnace.

No special design of electric furnace is necessary. Almost any one of the many designs of electric furnaces, either the arc and resistance, or the induction types, may be used, although some designs are more efficient than others.

The manner of introducing the gases into the furnace is a question of efficiency and economy and is related to the cost of both the electricity and the gas. The reducing agent may or may not be preheated before being introduced into the furnace, but I have found that it is desirable to preheat the reducing agent, especially if a hydrocarbon be used for this purpose. And, indeed, the entire heat necessary for this operation may be imparted to the reducing agent rather than to the charge. A hydrocarbon or vaporized petroleum has no effect as a reducer unless both it and the ore be at or above the temperature of decomposition, and in contact at such temperatures.

I claim:

The process of reducing iron ores to the metallic state consisting of heating said ores within a furnace to the necessary temperature in the presence of hydrogen as the reducing agent, excluding all oxidizing gases, admitting to the furnace only such amounts of carbon as shall give to the reduced metal the desired amount of carbon content, and regulating the temperature of all parts of the charge to cause the desired amount of silica in the ore and in the fluxing material to be reduced and as silicon to combine with the iron, then withdrawing the metal from the furnace in the desired condition.

E. BRUCE PRATT.

Witnesses:
R. E. CHANDLER,
E. J. BRADSHAW.